May 7, 1963 P. L. STANTON 3,088,456
ANESTHETIZING AND GAS THERAPY APPARATUS
Filed Feb. 8, 1960 3 Sheets-Sheet 1

INVENTOR.
PHILIP L. STANTON
BY
Paul A. Weilein
ATTORNEY

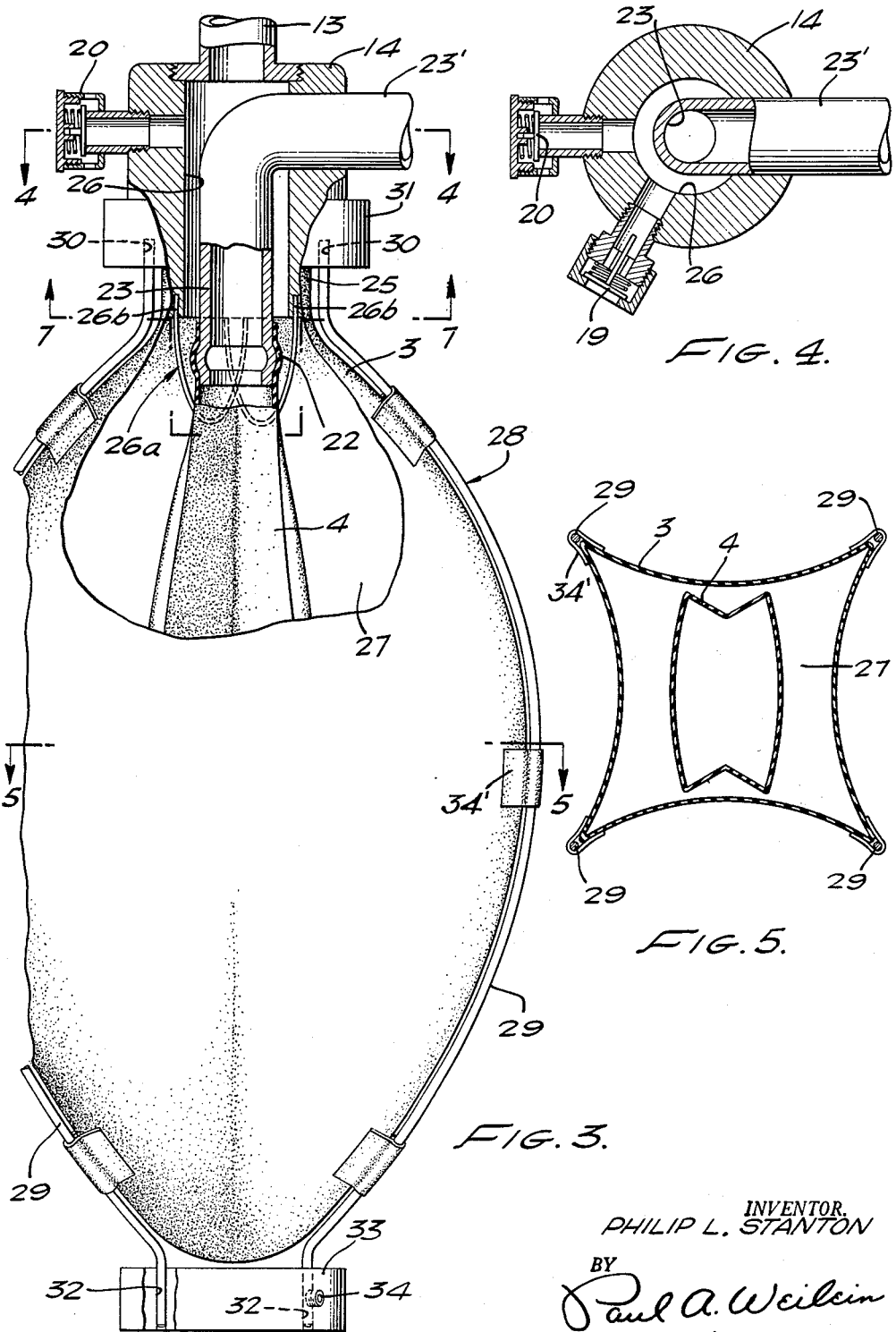

May 7, 1963 P. L. STANTON 3,088,456
ANESTHETIZING AND GAS THERAPY APPARATUS
Filed Feb. 8, 1960 3 Sheets-Sheet 3

INVENTOR.
PHILIP L. STANTON
BY
Paul A. Weilein
ATTORNEY

United States Patent Office 3,088,456
Patented May 7, 1963

3,088,456
ANESTHETIZING AND GAS THERAPY
APPARATUS
Philip L. Stanton, 389 Flintridge Oaks, Pasadena, Calif.
Filed Feb. 8, 1960, Ser. No. 7,366
3 Claims. (Cl. 128—29)

This invention relates to respiratory apparatus that is optionally operable as an anesthetizer, a resuscitator and for other gas therapy purposes.

It is known that anesthetizing machines and mechanical respirators such as pulmometrically controlled gas operated resuscitators have been combined so that the resultant apparatus may be selectively operated for anesthetizing, resuscitating and other oxygen therapy purposes. Heretofore, such gas operated respirators have been comparatively complex and bulky in that each such device includes a housing containing a venturi unit and an actuating member, which latter, in response to differential gas pressure on opposite sides thereof, moves to operate spring loaded toggle means and valve means for controlling flow of gas into and from the lungs of a patient according to intrapulmonary pressures.

It is an object of the present invention to provide novel gas operated respiratory apparatus that may be used advantageously in combination with means for providing a gas flow circuit between a source of gas and the lungs of a patient, for example, in an anesthetizing machine, and which constitutes an improvement over mechanical respirators heretofore produced, in point of simplicity and inexpensiveness of construction, the elimination of many elements and substantially all of the moving parts heretofore required, and ease and accuracy of control and operation in association with a gas flow circuit such as described, optionally as an anesthetizer, a resuscitator and for other oxygen therapy purposes.

This invention contemplates achievement of the aforementioned objectives and other objectives hereinafter noted, through the use of novel and simply constructed respiratory apparatus including a pair of related expansible and contractible means, such as bags or bellows or other expansible chamber devices, together with means operatively associated with the bellows for creating differential gas pressures in one of the bellows for controlling the operation of the other bellows. One of the bellows is adapted to be connected to means providing a gas flow circuit between a source of gas and the lungs of a patient, for example, in an anesthetizing machine. The other bellows is adapted to be connected with means operable for creating differential gas pressures therein. The two bellows are operatively related in a manner such that the bellows connected to the gas flow circuit will operate to force gas therefrom under pressure through the circuit into the lungs of a patient and to evacuate the lungs incident to expansion and contraction of the bellows in which the differential pressures are developed.

A simply constructed venturi unit may be employed to create the differential pressures above noted and may be operated by any suitable gas under pressure, for example, compressed air. This venturi unit is constructed and arranged so that while held in one hand of the operator, the placement of a finger or part of a hand over a port in the unit or the use of any other means for closing this port, and the removal of the finger or portion of the hand or other means from position closing this port, will in the one instance cause gas under pressure above atmospheric to flow from the venturi unit into the bellows connected therewith, and in the other instance cause the venturi unit to create subatmospheric pressure in that bellows.

It is another object of this invention to provide novel gas operated, manually controlled respiratory apparatus that does not require use of a housing to enclose the bellows and the venturi unit, or use of a pressure responsive actuator member, valve members and toggle mechanism for operating the valve members, all as heretofore employed, thereby appreciably reducing the number of parts heretofore required as well as the cost thereof, also the assembly cost, and providing simply constructed and inexpensive respiratory apparatus which may be efficiently manually controlled for use as a resuscitator, or in connection with an anesthetizer, or for other oxygen therapy purposes.

An additional object of the invention is the provision of respiratory apparatus such as next above noted, which is constructed and arranged so that it may be collapsed or folded into small compass for being carried in the equipment bag of an anesthetist.

A further object is the provision of gas pressure operated apparatus such as described which when attached in the gas flow circuit of a conventional anesthetic machine for the purpose of effecting a forced breathing of a patient and a forced administering of the anesthetic gas, also makes it possible to effect, at will, manual operation of the machine should this be desired or become necessary.

An additional object of this invention is the provision of apparatus such as described which when connected to a conventional anesthesia machine may, at any time it becomes necessary to resuscitate a patient being anesthetized, cause the machine to operate as a resuscitator in a particularly efficacious manner.

Other objects and advantages of the invention will be hereinafter described or will become apparent to those skilled in the art, and the novel features of the invention will be defined in the appended claims.

Referring to the drawings:

FIG. 3 is an enlarged fragmentary elevational view partly in section of the bellows forming a part of the apparatus shown in FIGS. 1 and 2;

FIG. 4 is a sectional view taken on the line 4—4 of FIG. 3;

FIG. 5 is a sectional view taken on the line 5—5 of FIG. 3 on a reduced scale;

Figure 1:
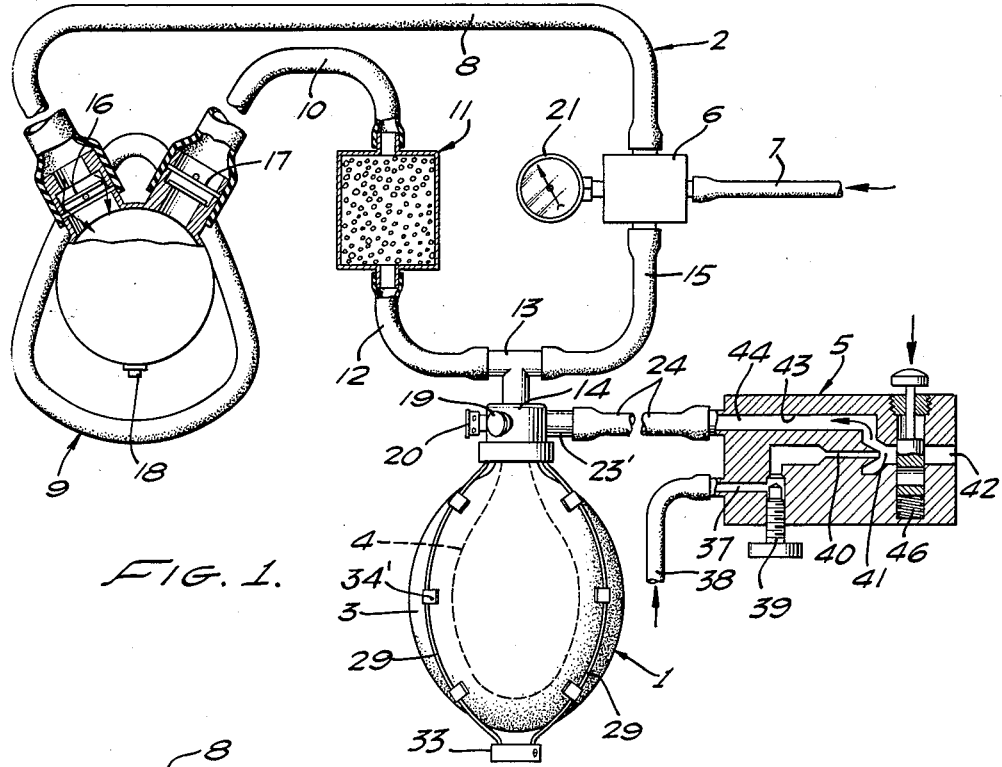
FIG. 1 is a schematic view with parts shown in side elevation and other parts in section, of apparatus embodying the present invention and as it would appear when operated to force gas under pressure into the lungs of a patient.

In the accompanying drawings, gas pressure operated apparatus embodying the present invention is generally designated 1 and shown in operative association with a schematically illustrated anesthetizing machine generally designated 2. The machine 2 is conventional except that the apparatus 1 embodying the present invention is connected to the machine in place of the conventional manually operated breathing bag or bellows (not shown) that is usually connected in the gas flow circuit provided by the machine for operation between a source of supply of an anesthetic or oxygen and the lungs of a patient.

Generally, the apparatus 1 embodying the present invention includes an expansible bag or bellows 3 made of rubber or other suitable elastomeric material, an actuating bag or bellows 4 likewise made of rubber or similar material, and gas pressure actuated means 5 here shown as a venturi unit selectively operable when coupled to a source of supply of gas under pressure, for creating in the bellows 4 above atmospheric pressure and subatmospheric pressure.

The bellows 3 is connected in the flow circuit of the machine 2 in place of the conventional manually operable breathing bag (not shown) and acts as a storage reservoir for the anesthetic or oxygen that is to be introduced into the patient's lungs in a manner to be hereinafter described. The bellows 4 is operatively related to the bellows 3 in such a manner that upon development in the bellows 4 of above atmospheric pressure and subatmospheric pressure, the bellows 3 will expel gas under pressure into the flow circuit of the machine and withdraw gas therefrom, respectively, in a manner and for the purpose to be hereinafter fully described.

The anesthetizing machine 2, as here shown, includes a mixing chamber 6 from which a hose or conduit 7 extends for connection with a source of supply of an anesthetic or oxygen, not shown. Gas entering the chamber 6 is applicable to the lungs of a patient through a hose or conduit 8 and a conventional mask 9. Gas exhaled from the patient's lungs passes through the mask 9, a hose line or conduit 10, a conventional soda lime container 11, thence through a hose 12 to a T-fitting 13 joined to a coupling member 14 connected with the mouth of the bellows 3. From the chamber 6 another hose line or conduit 15 leads to the T-fitting 13 and member 14 which communicates the line 15 with the interior of the bellows 3, thereby completing the gas flow circuit of the anesthetizing machine. With this arrangement some of the anesthetic or oxygen entering the chamber 6 from the intake hose 7 will become stored in the bellows 3.

A check valve 16 is connected in the gas flow circuit of the machine 2 so as to open incident to the inhalation effort of the patient as well as in response to gas pressure in the hose or conduit 8, and to close upon exhalation of the patient into the mask 9. As here shown, the check valve 16 is mounted on the mask and in effect is in the hose line 8 leading to the mask.

A check valve 17 is also mounted in the gas flow circuit of the machine so as to open upon exhalation of the patient and to close in response to gas being supplied under pressure to the patient from the bellows 3. As here shown, the valve 17 is mounted on the mask and is in effect in the return line 10 leading to the soda lime container 11. The mask is also equipped with a conventional manually operable relief valve 18 which may be opened at will to relieve excess gas from the flow circuit.

A conventional vacuum safety valve 19 and a conventional above atmospheric pressure safety valve 20 are connected in the gas flow circuit of the machine, being here shown as mounted on the coupling member 14 and operable to relieve excessive negative and positive pressures, respectively, in the usual manner in resuscitators and similar respiratory apparatus to prevent injury of the lungs of the patient.

Figure 2:
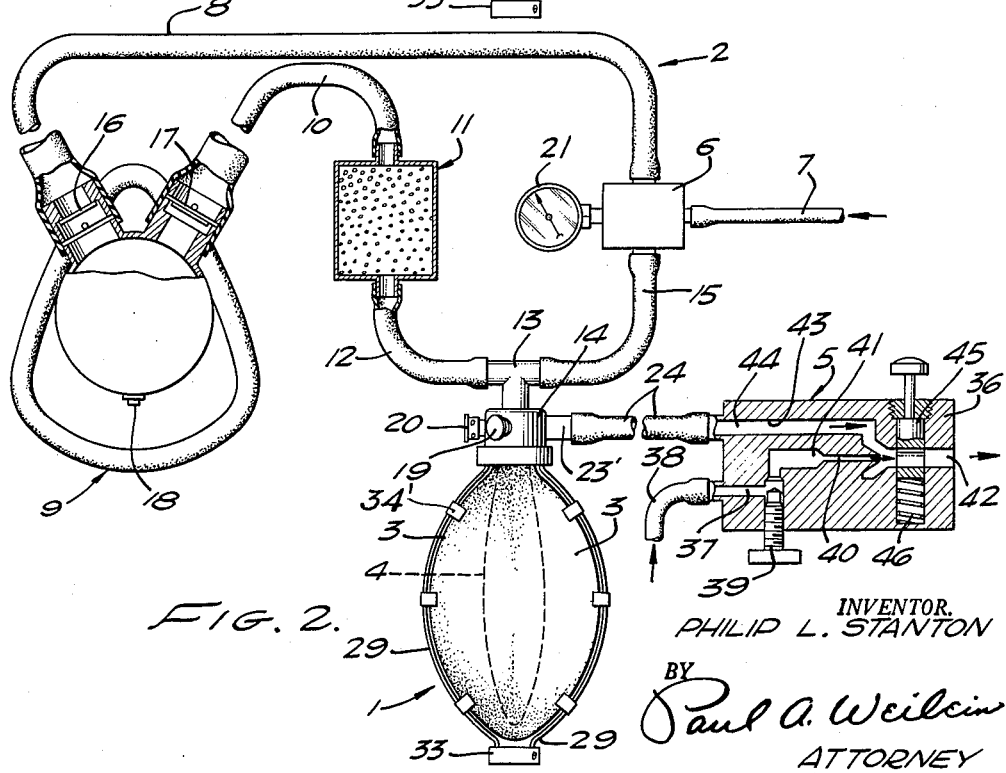
FIG. 2 is a view similar to FIG. 1 showing the apparatus as operated to withdraw gas from the patient's lungs.

In order that the operator of the apparatus shown in FIGS. 1 and 2 may at all times determine the pressure of gas in the lungs of the patient, a combined positive and negative pressure gauge 21 is connected in the gas flow circuit of the machine 2, being here shown as coupled to the mixing chamber 6.

It should be noted that it is contemplated that any arrangement of the bellows 3 and 4 may be employed, provided the bellows 3 will function as herein noted in response to above atmospheric and subatmospheric pressure in the bellows 4. However, as here shown, the bellows 4 being smaller is mounted within the bellows 3 and has its mouth 22 fitted onto the inner end of the L-shaped fitting 23, which latter is fixed to the coupling member 14 with an end 23' projecting laterally therefrom for connection to a flexible hose line or conduit 24 leading to the venturi unit 5.

The mouth 25 of the bellows 3 is fitted over the inner end of the coupling member 14 so that the bore 26 through the coupling member will provide for communication of the interior of the bellows 3 with the flow circuit of the anesthetizing machine through the T-fitting 13.

The relative sizes of the two bellows is such that a gas receiving chamber 27 of considerable capacity is provided between the exterior surface of the inner bellows 4 and the interior surface of the outer bellows 3.

Any suitable frame or similar structure means may be employed around the outer bellows 3 to limit the expansion and contraction thereof, it being preferable that this means be collapsible so that both bellows and the frame means be reduced to small size for placement in the supply bag of an anesthetist. As here shown, this restraining means comprises a skeleton frame 28 formed of a series of arcuate rods 29 embracing and generally conforming to the shape of the bellows 3. The upper ends of the rods 29 are free to turn in sockets 30 in the enlarged portion 31 of the coupling member 14. The lower ends of the rods are similarly mounted in sockets 32 formed in an annular member 33 at the lower end of the bellows 3. Set screws 34 may be provided to releasably hold the rods in place in the member 33. At intervals throughout the exterior of the bellows 3 are flexible fastening straps 34' which secure the rods to the outer surface of the bellows. With this arrangement the rods not only restrain expansion of the bellows 3, but also limit contraction or collapse thereof.

Another restraining means is provided in the bellows 3 adjacent the mouth 25 thereof to prevent an expansion of the bellows 4 to an extent that may obstruct flow of gas through the bore 26 of the coupling member 14. As here shown, this restraining means comprises a small skeleton wire frame 26a which is fastened as at 26b to the inner end of the coupling member 14 and extends well inwardly therefrom in surrounding relation to the portion of the bellows 4 adjacent the mouth 22, as shown in FIG. 3.

While the bellows may be formed of any suitable elastic material and shaped in any suitable manner provided they serve the purpose herein noted, they are preferably of the elongate and polygonal form in cross section here shown. The rods 29 are secured to the corner portions and are subject to being collapsed into small compass by being folded so as to lie close together upon the collapsed bellows.

The venturi unit 5 comprises a body 36 of a size and shape such that it conveniently may be held in one hand, there being an intake port 37 in the body 36 adapted to be connected through a flexible hose or conduit 38 with a source of gas under pressure, not shown. A manually operable valve 39 in the body 36 controls flow of gas into the venturi unit. In the body 36 is a venturi jet 40 disposed to operate in a passageway 41 leading from intake port 37 to a discharge port 42 that is open to the atmosphere. A passage 43 in the body 36 leads from the passage 41 to an outlet port 44 connected to the flexible hose line 24 leading to the inner bellows 4.

Figure 6:
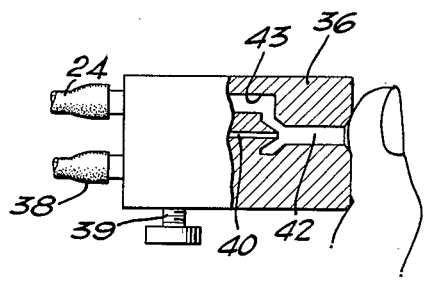
FIG. 6 is a fragmentary elevational and sectional view of a modified form of the venturi unit.
Figure 7:
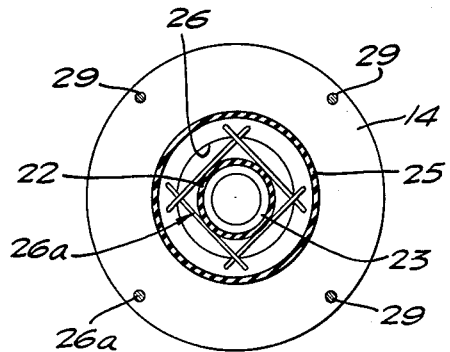
FIG. 7 is a sectional view taken on the line 7—7 of FIG. 3 on a reduced scale.

A normally open valve 45 on the body 36 may be operated to close and open the port 42, or the latter may be closed and opened by a finger of the operator in which case the valve 45 may be omitted as shown in FIG. 6. The valve 45 is biased by a spring 46 to normally open the port 42 and is depressed to close the port and released to open the port. With this arrangement the operator, while holding the venturi unit, may depress the valve 45 or place a finger or part of the hand over the port 42 so as to close this port and thereby cause the gas passing into the passageway 41 under pressure to flow out through the passage 43, port 44 and conduit 24 to expand the inner bellows 4 so as to actuate the outer bellows 3 to force gas therefrom. When the port 42 is uncovered, the venturi jet 40 discharges gas through the port 42 in a manner creating a subatmospheric pressure in the passages 41 and 43, the conduit 24, fitting 23 and inner bellows 4, for collapsing the inner bellows and thus creating a subatmospheric pressure in the outer bellows 3 whereby gas will be withdrawn from the patient's lungs through the mask 9, conduit 10, container 11, conduit 12 and into the outer bellows 3, through the fitting 13 and coupling member 14.

In the use of apparatus embodying this invention, as shown in FIGS. 1 and 2, for anesthetizing a patient, the mask 9 is applied to the patient and anesthetic gas entering the intake conduit 7 is passed at substantially atmospheric pressure or slightly above that pressure into the chamber 6, thence through hose 15 into the bellows 3, also through hose 8 and mask 9 into the patient's lungs in response to the breathing of the patient. At this time the venturi unit 5 is inoperable, the valve 39 being closed but the check valve 16 is opened and so held during the inhalation effort of the patient, the check valve 16 being opened by the inhalation effort of the patient. As the pressure of the anesthetic gas builds up in the patient's lungs, a back flow of the gas takes place through the mask 9, hose 10 and the soda lime container 11, which latter functions in the usual manner to remove the carbon dioxide. The check valve 16 closes and the check valve 17 opens responsive to the pressure of gas passing into the mask from the lungs of the patients, so that flow of the exhalation gas will take place through the hose 10, container 11, hose 12, fitting 13 and coupling member 14 into the outer bellows 3. The gas thus directed into the bellows 3 will be inhaled by the patient on the next inhalation effort of the patient and then exhaled as above noted back into the bellows 3 and these cycles will continue as long as the patient continues to breathe. Should it become necessary during this and subsequent constant introduction of the anesthetic or oxygen into the gas flow circuit, to bleed off some of this gas, the manually operable vent valve 18 on the mask may be opened.

When the depth of anesthesia of the patient or any other circumstance indicates that it is desirable to continue to anesthetize by forcing the gas under pressure into the patient's lungs and evacuating the gas therefrom, the operator opens the valve 39 in the venturi unit 5 to supply gas under pressure thereto, and depresses the valve 45 or places his finger or part of the hand holding the venturi over the outlet port 42, thereby closing this port and causing gas under pressure to flow through the passages 41 and 44 into the hose line 24, thence into the inner bellows 4 so as to inflate the inner bellows in a manner causing the anesthetic that has accumulated in the outer bellows 3 to be expelled therefrom under pressure. The anesthetic gas thus expelled under pressure from the bellows 3 passes through the coupling member 14, T-fitting 13, hose 15, mixing chamber 6, hose line 8 and mask 9 into the patient's lungs, the check valve 16 opening responsive to the pressure in the hose line 8. Also at this time the pressure of the gas forced from the outer bellows 3 is effective through the hose line 12, the container 11 and the hose line 10 to seat and maintain seated the check valve 17. When the check valve 17 is thus seated, the anesthetic gas is trapped in the lungs of the patient so that the apparatus continues to operate on the inhalation phase until such time that it is necessary for the venturi unit 5 to be operated to stop this phase and commence the exhalation phase. The timing of these phases is made possible by the positive and negative pressure gauge 21 which enables the operator to determine at all times the pressures in the patient's lungs. Accordingly, when it is determined that the inhalation cycle be stopped and the exhalation cycle commenced, the operator removes his finger covering the port 42 or releases the valve 45, as the case may be, and the venturi unit then functions to create a subatmospheric pressure in the inner bellows 4. This will cause the inner bellows 4 to collapse and thereby create a subatmospheric pressure in the outer bellows 3, and that is effective in the hose line 8 to close the check valve 16 and in the line 10 to open the check valve 17 so that anesthetic gas will be withdrawn from the patient's lungs through the mask 9, conduit 10, container 11, hose line 12, fitting 13 and coupling 14, back into the outer bellows 3. These cycles are repeated as necessary according to depth of anesthesia required, the bleeding off of the anesthetic being effected as may be required by opening relief valve 18 on the mask 9.

If it is desired to administer straight oxygen to the patient, oxygen from the source not shown, is supplied through the intake conduit 7 and therefore may be caused to enter the patient's lungs and expelled therefrom either through the breathing efforts of the patient or through the operation of the apparatus as a resuscitator in the same manner as when administering an anesthetic.

Figure 8:
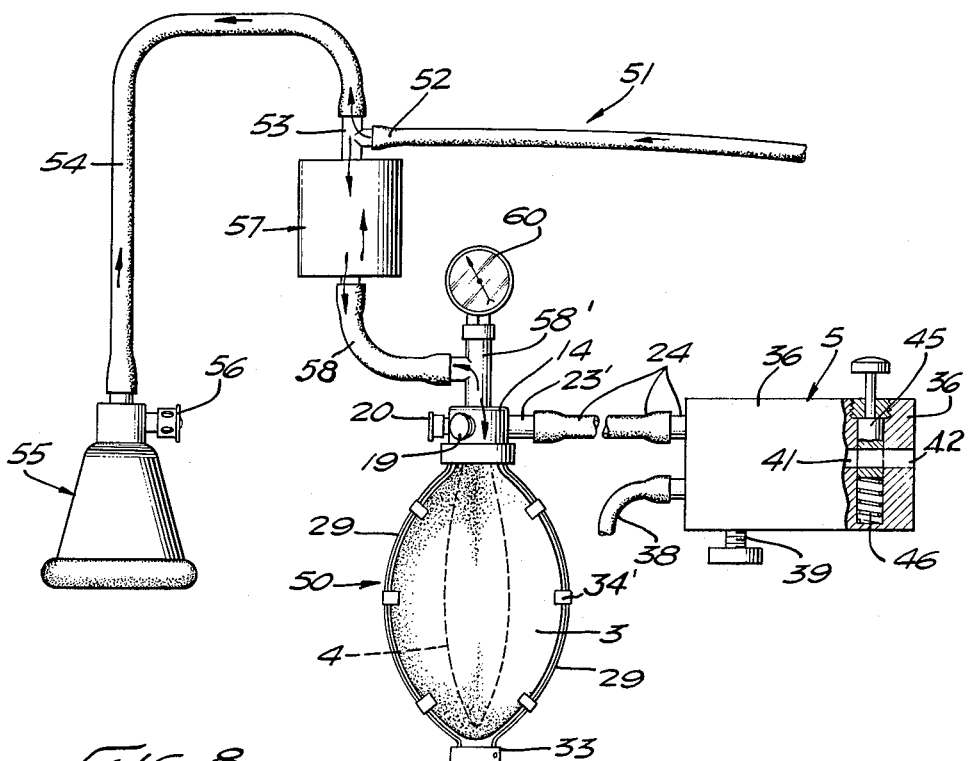
FIG. 8 is a schematic elevational view partly in section showing the apparatus embodying the invention as it would appear when connected with a gas flow circuit of a different type than shown in FIGS. 1 and 2.

FIG. 8 shows apparatus generally designated 50 and embodying the present invention as it would appear when connected for operation with a different form of gas flow circuit than shown in FIGS. 1 and 2. This different gas flow circuit is provided by a conventional anesthetizing machine 51 wherein a single flow line is provided for the inhalation and exhalation of gas by the patient, instead of the two lines as shown in FIGS. 1 and 2. Accordingly, the machine 51 here shown includes an intake line 52 adapted to receive gas from a source not shown, the gas being either oxygen or a mixture of oxygen and an anesthetic and also being under just sufficient pressure to cause slow flow thereof from the source into the line 52. From the line 52 the gas passes through a fitting 53 into a conduit or line 54 leading to the mask 55, the mask being provided with a conventional manually operable bleed valve 56. With this arrangement the line 52, fitting 53, conduit 54 and mask 55 provide for conducting gas into a patient's lungs responsive to inhalation efforts of the patient.

Upon exhalation of gas by the patient, the exhaled gas passes through the mask 55, line 54, a conventional soda lime container 57 joined to the fitting 53, thence through a conduit 58 to a fitting 58'. To this fitting 58' is connected in the same manner as shown in FIGS. 1–5, the apparatus 50 embodying the present invention instead of the conventional manually operable breathing bag, not shown, that is usually connected to the fitting 58'.

The apparatus 50 embodying this invention is the same as that shown in FIGS. 1–5 and for this reason the parts thereof are designated by the same refernce characters as shown in FIGS. 1–5.

In the use of the combined apparatus shown in FIG. 8 for anesthetizing a patient in response to breathing of the patient, the gas from the line 52 is inhaled by the patient through the fitting 53, line 54 and the mask 55, and is exhaled back through the mask, the line 54, fitting 53, soda lime container 57, conduit 58, fitting 58' and into the outer bellows 3 which acts as a reservoir. On the subsequent inhalation effort of the patient some of the gas is drawn from the outer bellows 3 through the fitting 58', conduit 58, soda limit container 57, line 54 and mask into the lungs of the patient, and the inhalation and exhalation operations are continued as required by the anesthetist or operator. If desired or deemed necessary, the anesthetist or operator may manipulate the outer bellows 3 for forcing gas into the lungs of the patient and withdrawing gas in the same manner as when the conventional breathing bag (not shown) is coupled to the fitting 58'. A combined negative and positive pressure gauge 60 is provided in the gas flow circuit, as here shown, on the fitting 58', to indicate the lung pressure of the patient during operation of the machine, it being noted that during this operation of the machine, the valve 39 on the venturi unit 5 is closed so that the venturi unit is inoperable.

When it is desired to use the apparatus 50 of this invention to force gas under pressure into the patient's lungs and to withdraw gas from the lungs in an anesthetizing operation or for administering pure oxygen or similar gas, the valve 39 on the venturi unit 5 is open to allow gas under pressure to enter the venturi unit from the feed line 38. Once this gas is admitted to the venturi unit 5, the latter may be operated in the same manner as hereinbefore described to introduce gas under presure into the inner bellows 4 and to exhaust gas therefrom for inflating and deflating the outer bellows and thereby producing the forced inhalation and exhalation phases as desired by the anesthetist or operator. When the inner bellows 4 is inflated, it causes gas stored in the outer bellows 3 to be forced under pressure through the fitting 58', conduit 58, soda lime container 57, fitting 53 and conduit 54 to the mask, thence into the patient's lungs. When the venturi unit is operated to create a subatmospheric pressure in the inner bellows 4, the latter is contracted and creates a subatmospheric pressure in the interior of the outer bellows 3, thereby creating suction through the fitting 58', conduit 58, soda lime container 57, conduit 54 and mask to withdraw gas from the patient's lungs back through this same flow line into the outer bellows 3. These operations are repeated as deemed necessary by the anesthetist or operator.

It should be noted that the apparatus of this invention, whether combined with a machine as shown in FIGS. 1–5 or with the machine shown in FIG. 8, may be operated at will to wash out the anesthetic from the patient's lungs and introduce pure oxygen into the lungs either in an insufflation operation or in a resuscitation operation.

It should also be noted that the outer bellows 3 when used as shown in FIGS. 1–5 or as shown in FIG. 8, may be operated manually to cause the entire system including the outer bellows 3 to be filled with gas before commencing the operation of the machine while the patient is breathing or when the breathing of the patient is depressed and the machine is operated for forced breathing.

Should it become necessary or desired to produce forced breathing by means other than the venturi unit in the apparatus shown in FIGS. 1 and 2 as well as in the apparatus shown in FIG. 8, the outer bellows 3 may be manipulated for this purpose, the skeleton frame around the bellows 3 permitting ready access to this bellows at all times.

While specific structural details have been shown and described, it should be understood that changes and alterations may be resorted to without departing from the spirit of the invention as defined in the appended claims.

I claim:

1. Respiratory apparatus for connection with means for providing a gas flow circuit between a source of gas and the lungs of a patient comprising: a pair of bellows mounted one within the other to define therebetween an expansible chamber; the outer bellows of said pair having an opening for intaking and expelling gas; conduit means connecting said opening with said circuit; means embracing and connected with said outer bellows to restrain expansion and contraction thereof; said outer bellows operating to expel gas from said chamber through said opening and to intake gas through said opening into said chamber in response to expansion and contraction of the inner bellows; and means for expanding and contracting said inner bellows by developing positive and negative pressures therein.

2. Respiratory apparatus for connection with means for providing a gas flow circuit between a source of gas and the lungs of a patient comprising: a pair of bellows mounted one within the other to define therebetween an expansible chamber; the outer bellows of said pair having an opening for intaking and expelling gas; conduit means connecting said opening with said circuit; means embracing and secured to said outer bellows to restrain expansion and contraction thereof; said outer bellows operating to expel gas from said chamber through said opening and to intake gas through said opening into said chamber in response to expansion and contraction of the inner bellows; and gas actuated venturi means connected with said inner bellows and manually operable optionally to create in said inner bellows pressures for expanding and contracting said inner bellows.

3. Respiratory apparatus for connection with means for establishing a gas flow circuit between the lungs of a patient and a source of gas, comprising: means providing a chamber communicable with said flow circuit; expansible and contractible means within said chamber for creating positive and negative gas pressures in said chamber upon expansion and contraction; and means for expanding and contracting said expansible and contractible means, said last-mentioned means comprising a member having an air passage adapted to conduct therethrough air under pressure; means connecting said air passage to said expansible and contractible means; said member having a venturi in said air passage; said member having an open port leading from said venturi to atmosphere whereby air passing through said air passage will draw air from said expansible and contractible means to contract the latter, and air will pass through said passage to said expansible and contractible means to expand the latter when said port is closed.

References Cited in the file of this patent

UNITED STATES PATENTS

| | | |
|---|---|---|
| 1,213,160 | Davis | Jan. 23, 1917 |
| 2,284,964 | Mautz et al. | June 2, 1942 |
| 2,924,215 | Goodner | Feb. 9, 1960 |
| 2,969,789 | Morch | Jan. 31, 1961 |

FOREIGN PATENTS

| | | |
|---|---|---|
| 1,177,578 | France | Dec. 1, 1958 |